United States Patent Office 3,563,794
Patented Feb. 16, 1971

3,563,794
FIBROUS MATERIALS IMPARTED HYDROPHILIC AND ANTISTATIC PROPERTIES AND THE IMPROVED METHOD FOR PRODUCING THE SAME
Hiroyuki Moriga, Ibaragi-shi, Japan, assignor to Teijin Limited, Osaka, Japan, a corporation of Japan
No Drawing. Filed Feb. 15, 1968, Ser. No. 705,607
Claims priority, application Japan, Feb. 20, 1967, 42/10,827; July 11, 1967, 42/44,613
Int. Cl. B44d 1/44; B32b 27/08, 27/34
U.S. Cl. 117—138.8
6 Claims

ABSTRACT OF THE DISCLOSURE

Improved fibrous materials having a hydrophilic property and a durable antistatic property are prepared by applying a treatment liquid consisting of at least the three components:
(a) an N-substituted polyamide whose amount of combined formaldehyde is 3–15% by weight,
(b) an alkoxylated derivative of an aliphatic nitrogen or oxygen containing compound having an active hydrogen atom bonded to the nitrogen or oxygen atom and containing at least two functional groups, said derivative corresponding to the formula:

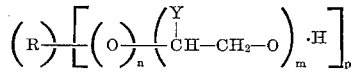

wherein R is an aliphatic group derived from said nitrogen or oxygen containing compound, said nitrogen or oxygen containing compound being selected from:
(i) aliphatic polyhydric alcohols;
(ii) aliphatic heterocyclic polyhydric alcohols;
(iii) fatty acid esters of aliphatic alcohols;
(iv) polyalkylene polyamines; and
(v) polyoxyalkylene polyamines
Y is selected from the group consisting of hydrogen and methyl;
$n$ is selected from 0 and 1;
$m$ is the number of moles of alkylene oxide reacted with said nitrogen or oxygen containing compound; and
$p$ is a positive integer such that $m \times p$ is 5–100; and
(c) a catalyst which is either an acid or an acid-forming substance,
to a synthetic fibrous material and heat-treating the so-treated fibrous material to cause the reaction of the aforesaid components (a), (b) and (c) to take place on said material.

This invention relates to improved fibrous materials which have been imparted a hydrophilic property (hereinafter to be at times referred to as wettability) to a suitable degree and a durable antistatic property to a high degree, both of which properties are desirable in a synthetic fibrous material. The invention also relates to an improved method of producing the foregoing improved fibrous materials.

More specifically, this invention relates to a method of imparting to synthetic fibrous materials improved hydrophilic and antistatic properties, which are durable, and to the so-improved synthetic fibrous materials, the method being characterized in that a treatment liquid consisting of at least the three components of
(a) an N-substituted polyamide whose amount of combined formaldehyde is 3–15% by weight,
(b) an alkoxylated derivative of an aliphatic nitrogen or oxygen containing compound having an active hydrogen atom bonded to the nitrogen or oxygen atom and containing at least two functional groups, said derivative corresponding to the formula:

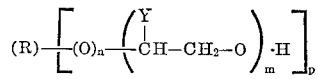

wherein R is an aliphatic group derived from said nitrogen or oxygen containing compound, said nitrogen or oxygen containing compound being selected from:
(i) aliphatic polyhydric alcohols;
(ii) aliphatic heterocyclic polyhydric alcohols;
(iii) fatty acid esters of aliphatic alcohols;
(iv) polyalkylene polyamines; and
(v) polyoxyalkylene polyamines
Y is selected from the group consisting of hydrogen and methyl;
$n$ is selected from 0 and 1;
$m$ is the number of moles of alkylene oxide reacted with said nitrogen or oxygen containing compound; and
$p$ is a positive integer such that $m \times p$ is 5–100; and
(c) a catalyst which is either an acid or an acid-forming substance,
is applied to a synthetic fibrous material and said fibrous material which contains the treatment liquid is heat treated to cause the reaction of the aforesaid components (a), (b) and (c) to take place on said material.

The term "synthetic fibrous materials," as herein used, denotes the hydrophobic synthetic fibrous materials and is a generic term of yarn, tow, sliver, web, filament, staples, ribbon, twisted yarn, bulky yarn and all other fibrous materials as well as woven, knitted, nonwoven and all other forms of fabric articles of fibrous materials composed thereof.

As is widely known, synthetic fibrous materials are hydrophobic and hence their capacity of absorbing water is small. Consequently, they possess such drawbacks as that they tend to generate a static charge by such as friction, with the consequence that at times a static charge is readily generated in wearing or utilizing clothing to cause an adhesive tendency to take place between themselves, or sparking occurs during their handling. Again, there is a tendency to clothing becoming easily soiled by dust being statically adsorbed. Further, there is also the shortcoming that the fibrous materials from which soil has been once removed by washing have a tendency to re-adsorb soil from the washing liquor.

Various proposals have been made from of old for improving on these drawbacks, but the fact is that investigations are still being continued in this matter.

The principal reason for this is that if it is attempted to improve the antistatic property imparted to the synthetic fibrous materials to an extent as to be fully satisfactory, i.e., to an extent as to be fully serviceable, a highly hydrophilic substance would naturally need to be used, with the consequence that the imparted antistatic agents would easily leave the fibrous material by washing and only a temporary improvement effect could be imparted. On the other hand, if it is attempted to avoid this fatal defect and obtain a durable treatment result, there would be such drawbacks as that the improvement in the antistatic property would have to be more or less sacrificed and/or that excessively complicated and uneconomical means would be required and/or that the various desirable properties possessed by the synthetic fibrous materials would have to be more or less sacrificed and/or that the handle and feel of the product would be greatly impaired, and, in addition, that the increase in the adhesiveness of the soil could not be avoided. Hence, there was the problem that the two requirements were incompatible. This also resulted in greatly limiting the field in which the product could be used even though it were possible to impart a durable antistatic property to the fibrous material forcibly.

Thus, much effort is still being continued to be expended even at this date with a view to finding a simple means of imparting to synthetic fibrous materials a suitable wettability as well as a fully serviceable antistatic property along with the various excellent properties of wash durability, soilproofness, abrasion resistance and nondiscolorability, without sacrificing the various desirable properties inherently possessed by these fibrous materials.

In the past, the antistatic agents used were, for example, the polyhydroxy compounds, polyamines and these salts thereof, which were in practically all cases soluble in water, and hence in most cases they were only useful in preventing the antistatic charge temporarily and would readily part from the fibrous materials when the latter were washed or dry cleaned.

Further, for example, a combination of a polyepoxy, polyamide and polyamine or these and a water-soluble substance such as hydroxyamine has been used for imparting a durable antistatic property, but the defect that the two requirements were incompatible could not be avoided, and hence fully satisfactory results still could not be had. Moreover, modified polyamide obtained by introducing side chain therein, for example, the type 8-nylon in which was introduced the methoxymethyl group, had been proposed as a water absorption treatment of such as the polyamide fibers, but neither a suitable hydrophilic property nor a satisfactory antistatic property could be imparted by the introduction of the methoxymethyl group. In addition, the insolubilization of a cellulose-derivative at the surface of fibrous materials had also been attempted, but generally in a process in which insolubilization is carried out by forming a polymeric film on the surface of a fiber, either the handle of the fabric is impaired as a general rule or since the resistance to abrasion is unsatisfactory, either difficulty is encountered in retaining the resulting film stably in place on the fiber or the antistatic property readily declines. Hence, it still was not possible to solve at a single stroke the aforesaid problem that the two requirements were incompatible.

As a result of our researches with a view to solving this technical problem of the incompatibility of the two requirements at a single stroke, we found that by applying a treatment liquid consisting of at least the aforesaid three components of (a), (b) and (c) to a synthetic fibrous material and then heating the treatment liquid-containing fibrous material to effect the reaction of the aforesaid components of (a), (b) and (c) on said fibrous material, the insolubilization and introduction of the hydrophilic group could be carried out at the same time and the problem that two requirements were incompatible would be solved and the resulting article would conjointly possess a suitable hydrophilic property and a high degree of antistatic property, which properties are both durable.

It is therefore an object of this invention to provide, as a result of having solved the heretofore posed problem of incompatibility of the two requirements, improved fibrous materials which conjointly possess not only a suitable hydrophilic property and a high degree of antistatic property, but also which possess a high degree of washability and resistance to abrasion, and in which the improved properties are permanently retained. Another object is to provide an improved method by which the foregoing fibrous materials are produced without adverse effects being had on the other desirable properties of the synthetic fibrous materials to be treated or impairment of their desirable handle and, in addition, without discoloration of the treated materials.

Other objects and advantages of the invention will be apparent from the following description.

The antistatic agent used in this invention is a treatment liquid consisting of at least the three components of (a), (b) and (c), as hereinbefore noted, which, upon being heated, reacts atop the synthetic fibrous material to result at the same time in the introduction of a hydrophilic group thereto.

In this invention the aforesaid component (a) is an N-substituted polyamide whose amount of combined formaldehyde is 3–15%, preferably 4–10% by weight. This component (a) is the component which reacts with component (b) upon being heated in the presence of the catalyst [component (c)] to become insolubilized on the synthetic fibrous material.

As this component (a) the known N-substituted polyamides whose amount of combined formaldehyde is within the hereinabove indicated range are used.

When the amount is less than the lower limit of 3% by weight, and preferably 4% by weight, the amount of the component (b) which reacts with component (a) becomes less, with the consequence that the conjoint possession of the hydrophilic and antistatic properties to a suitable degree is rendered impossible, and the handle and feel of the product is greatly impaired.

On the other hand, when the amount exceeds the upper limit of the range of 15%, and preferably 10% by weight, the stability and manageability of the component (a) not only becomes more unsatisfactory as the amount increases but the yield also declines. Hence, it becomes difficult from the standpoint of its handling to feed the component (a) stably.

Hence, it is necessary to use as the component (a) N-substituted polyamides whose amount of combined formaldehyde is within the aforesaid range.

N-substituted polyamides are obtained by means which are known per se. For example, they are obtained by reacting either 6 nylon, 66 nylon, 610 nylon or the various other polyamide polymers or copolymers with formaldehyde in the presence of water and/or alcohols.

As the N-substituted group, utilizable are the methylol and alkoxymethyl groups such as —CH₂OH,

—CH₂OCH₃

—CH₂OC₃H₇ and —CH₂OC₄H₉. These N-methylol polyamides and N-methoxymethyl polyamides, which can be produced at low cost, are desirable N-substituted polyamides. Since these modified polyamide resins have a lower melting point than the polyamide resins and their content of the hydrogen atom of the acid amide group is less, they are soluble in water-containing alcohol. Thus, they can be utilized as a water-containing alcohol solution or an aqueous dispersion.

On the other hand, in this invention the component (b), upon being heated, reacts with the N-substituted group possessed by the aforesaid component (a), in the presence of the catalyst [component (c)], to impart hydrophilic and antistatic properties to the product as well as acts, at times, as a cross-linking agent. This component is represented by the hereinbefore indicated Formula 1.

As R, the aliphatic polyhydric alcohol residues or polyalkylene polyamine residues are preferred. As these residues, particularly preferred include, for example, the aliphatic polyhydric alcohol residues such as the sorbitol residue, pentaerythritol residue and glycerine residue, and the polyalkylene-polyamine residues such as the tetraethylene pentamine residue and diethylene triamine residue. Also usable are the aliphatic polyhydric alcohol residues such as the trimethylol-propane residue and tetramethylcyclohexanol residue and, in addition, the other polyalkylene-polyamine residues such as ethylene diamine and dipropylene triamine.

As another R, included are the aliphatic heterocyclic polyhydric alcohol residues chosen from the mono- and disaccharide residues such, for example, as the sugar residue, glucose residue, Arabinose residue and mannose residue. As a still another R, mention can be made of the residual groups of a monocarboxylic acid (having 6–18 carbon atoms) esters of sorbitan such, for example, as sorbitan monolaurate, sorbitan monostearate and sorbitan monooleate, and also the monoester of pentaerythritol and the monoester of glycerine. In addition, the polyoxyalkylene-polyamines which consist of triethylene glycol and tetraethylene glycol whose both ends have been aminated can be mentioned.

While the Y in the Formula 1 may be a hydrogen atom or —$CH_3$ group, it may, of course, be also one having both, for example, that in which the part in the formula represented by

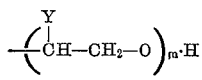

is a block copolymer chain of propylene oxide and ethylene oxide, such an instance also being comprehended by the foregoing Formula 1. It goes without saying that the component (b) represented by the hereinbefore given Formula 1 may not only be a single substance but also a mixture, which is also comprehended by the component (b) of this invention.

When R is an aliphatic polyhydric alcohol residue, for example, a sorbitol residue or pentaerythritol residue, its reactivity with component (a) is enhanced as an increase takes place in its terminal hydroxyl group. Hence, a component (b) having a molecular weight of not more than 10,000, preferably not more than 5000, and especially one in which $m \times p = 5-100$ moles, is utilized. The above applies equally to the instance when the R is an aliphatic heterocyclic polyhydric alcohol residue, an aliphatic ester residue of said polyhydric alcohol, a polyalkylene-polyamine residue and a polyoxyalkylene-polyamine residue.

Specific examples of component (b) in the case where $q$ is 0, as hereinbefore described, include such as polyethylene glycol (molecular weight 200–3500), polyoxyethylene glycerin ether, polyoxyethylene pentaerythritol ether, polyoxyethylene sorbitol ether, polyoxyethylene mannitol ether, ethylene oxide adduct of trimethylolpropane, ethylene oxide adduct of tetramethylolcyclohexanol, as the ethylene oxide adduct of aliphatic heterocyclic polyhydric alcohols, the ethylene oxide adducts of polyoxyethylene sucrose ether and also of such as glucose, mannose and Arabinose, as the ethylene oxide adducts of aliphatic heterocyclic polyhydric alcohol esters, polyoxyethylene sorbitan monolaurate, polyoxyethylene sorbitan monostearate and polyoxyethylene sorbitan monooleate, as the ethylene oxide adducts of the esters of aliphatic polyhydric alcohol, ethylene oxide adduct of pentaerythritol monolaurate and ethylene oxide adduct of glycerine monolaurate, as the ethylene oxide adducts of polyalkylene-polyamines, ethylene oxide adducts of such as ethylene diamine and hexamethylene diamine and ethylene oxide adducts of such as tetraethylene pentamine, diethylene triamine and dipropylene triamine. On the other hand, as the polyoxyalkylene-polyamines, mention can be made of the compounds which have been obtained by adding ethylene oxide to triethylene glycol or tetraethylene glycol whose both ends have been aminated.

In any event, the component (b) should be a water-soluble substance whose $m \times p$ is 5–100 moles, which is used alone or in combinations.

Unlike this invention, even though the polyhydric alcohols unsubstituted with polyoxyalkylene, for example, glycerin, sorbitol, polyvinyl alcohol or cellulose, and the polyamines, for example, tetramethylene pentamine and polyethylene imine are reacted with polyamides exhibiting high hydrophobicity, they are still not sufficient to impart a hydrophilic property. Consequently, neither wettability nor antistatic activity is imparted.

Component (c), the other component of this invention, is a known acid or acid-forming substance (a substance which forms acid during the heating step), which functions as catalyst in the reaction of the components (a) and (b).

As this component (c) can be mentioned such, for examples, as oxalic citric, tartaric, maleic, malonic and p-toluenesulfonic acids, and the ammonium or the volatile lower amine salts thereof.

The treatment liquid used in the invention method, which consists of at least these three components of (a), (b) and (c), may be either a solution or a suspension or emulsion, it being usually used as a water-containing methanol solution or an aqueous dispersion. This treatment liquid is provided by adding the component (c) to a liquid composition containing the components (a) and (b), but the order of mixing the components may be in any other order, as desired.

The component (c) is suitably chosen in conformance with the treatment conditions in which the components (a) and (b) are reacted on the synthetic fibrous material. For example, when it is desired to complete the reaction in about 30 seconds to one minute, a catalyst such as maleic or oxalic acid is conveniently used, whereas when the period of time desired for completing the reaction is on the order of 5 to 10 minutes, citric acid is suitably used. These catalysts are used in an amount of 1–20% by weight, based on the N-substituted polyamide, in accordance with the treatment conditions and are added as an aqueous solution. Thus, the reaction and the imparting of a hydrophilic property can be carried out concurrently on the fibrous material in a very short period of time. Since a method of treatment which stiffens the handle of woven and knit fabrics is not desirable, the use of a large amount of the N-substituted polyamide should be avoided and the N-substituted polyamide, the component (b) and the catalyst together should be used such that the total concentration becomes 0.1–5.0%, and preferably 0.2–2.0%. Further, the composition of the component (a) N-substituted polyamide and the component (b) should preferably be in a weight ratio ranging between 1:1 and 1:10.

The synthetic fibrous materials used include the polyamides, polyesters and polyacrylontriles, and especially remarkable effects are demonstrated in the case of the polyamide type synthetic fibrous materials.

The treatment may be carried out by applying the treatment liquid, such as hereinbefore described, to the synthetic fibrous material by application with a brush or roller, spraying, dipping or any other known techniques and thereafter heating the material at an optional temperature at which the components (a) and (b) will react in the presence of component (c). Thus, the components (a) and (b) react on the material to render themselves insoluble and moreover in view of the possession of hydrophilic groups to a suitable degree not only excellent wettability is imparted but also a high degree of antistatic property is demonstrated. Further, the improved properties imparted demonstrate outstanding durability.

In one mode of the treatment, the polyamide synthetic fibrous material may be dipped in the treatment liquid, then squeezed such that the liquid pickup becomes 50–100% by weight followed by drying for several minutes at 80–120° C., and thereafter heat treated for 30 seconds to 10 minutes at 150–180° C. Alternatively, the drying may be carried out for several tens of seconds at 130–140° C. followed by heat treating for several tens of seconds at 150–180° C.

The following examples illustrated several modes of practicing the invention method. In the following examples, comparisons and controls, the antistatic properties and wettability are indicated by values measured and calculated in the following manner.

(I) ANTISTATIC PROPERTIES (i) Test for electric charge generated

The moisture content of a sample cloth is adjusted by exposing for 48 hours to standard conditions (temperature 20°±2° C.). This moisture content-adjusted sample cloth is mounted on the drum of a rotating drum type frictional electric charge tester (produced by Denpa Kogyo Company, Japan). Using a cotton broad cloth as the standard frictional cloth, this is mounted with a given tension. After the contact between the sample cloth and the frictional cloth is fully confirmed, the drum is rotated at 650 r.p.m., and when the electricity charged reaches equilibrium, the amount of electric charge is read. Six pieces of the same sample cloth are prepared and the test is performed on each piece. The reading of the six pieces of cloth are averaged and this value is designated electric charge generated (volt).

The greater this value, the lesser the antistatic property becomes, whereas the smaller this value, the more excellent the antistatic property becomes.

(ii) Specific resistance test

Two grams of dried sample cloths are collected at random and their moisture content is adjusted by exposing to standard conditions for 48 hours. Two grams of these moisture-adjusted samples are packed in the electrode cup of a fiber electric conductivity tester (produced by Oki Electric Company, Japan). The electrode lead wire which had been connected to the ground terminal is then transferred so as to be in connection with the cylinder terminal. The specific resistance is obtained by reading the indicator three minutes later. The specific resistances ($\Omega$) of six pieces of similar sample cloths are measured and their average value is calculated.

The greater this value, the lesser is the antistatic property, whereas the smaller this value, the greater is the antistatic property.

(iii) Test for wash durability of the antistatic property

After electric charge generated ($x$) of (i), above, was tested, the sample cloths are placed in an electric washing machine (produced by Toshiba Electric Company, Japan) and washed for 10 minutes at a water temperature of 50° C., using a washing water containing sodium alkylbenzene sulfonate at the rate of 1 gram per liter. Next, the sample cloths are taken out and dried, following which they are again washed in similar manner. After repeating this washing and drying cycle for 30 times, the sample cloths are submitted to the test for magnitude of electric charge of (i), above, and electric charge generated ($y$) is determined. The wash durability of the antistatic property is calucuated using the following equation:

$$\text{wash durability} = \frac{y-x}{x} \times 100\%$$

The larger this value, the greater the poorness of the antistatic property is indicated.

The results of (i), (ii) and (iii), above, are synthesized to evaluate the antistatic properties.

(II) WETTABILITY

Test for degree of water absorption

Under standard conditions (temperature 20±2° C., relative humidity 65±2%), one drop (0.025 cc.) of distilled water is dropped from a height of 2 cm. with a microburette (2 cc. capacity) in a fixed position, onto a piece of sample cloth stretched across in space. The number of seconds required for the water drop to diffuse and its total reflection disappear is designated as the measure of water absorbability. Six measurements are obtained with similar samples and an average value is obtained.

When this value is large, good wettability is not indicated. In general, the diffusion and permeation of the water drop does not continue infinitely in an untreated cloth. While the excellence of the wettability is indicated as this value becomes smaller, it must be noted that this value varies depending upon the density of the structure of the woven or knit fabric.

(III) HANDLE

The feel, appearance and pliability of the treated cloth, as compared with an untreated cloth, are respectively ranked by 30 observers (15 males and 15 females), into the five classes of excellent, good, same as the untreated cloth, a little worse and worse, the elevation being made independently by each observer. The evaluations are then synthesized and drawn as a distribution curve and the handle is evaluated by means of the evaluation corresponding to the distribution maximum.

With the evaluation identical to that of a untreated cloth being designated as 0, comparisons are made therewith and ratings of good for +5, excellent for +10, a little worse for −5, and worse for −10 are established to indicate the measurement of the handle.

EXAMPLE 1

Three parts by weight of polyoxyethylene sorbitol ether (in Formula 1 $m \times p = 40$, i.e. the number of moles of ethylene oxide added = 40) were dissolved in 100 parts by weight of an aqueous dispersion of N-methoxymethyl nylon (the amount of combined formaldehyde is 4.5% by weight) of 0.5% concentration, to which are added as catalyst 2 parts by weight of 4% aqueous ammonium tartrate to prepare the treatment liquid.

A nylon knit fabric was dipped in this treatment liquid for 30 seconds at room temperature, and then after squeezing it to a pick-up of 70% by weight, it was dried for 5 minutes at 120° C. and thereafter heat treated for 5 minutes at 160° C. After water-washing and drying this treatment-completed nylon knit fabric, it was tested for its antistatic properties, wettability and handle in accordance with the hereinbefore described test methods. The results obtained are shown in Table I, below. In Table I are also shown for purpose of reference the results obtained in the case where untreated nylon knit fabric was tested, the test being conducted in exactly the same manner except that the fabric had not been given the aforesaid treatment (control), and the results obtained in the case the experiment was carried out exactly as hereinbefore described except that the conventional treatment liquid was used.

TABLE I

| Experiment | Antistatic properties | | | Wettability (sec.) | Handle |
|---|---|---|---|---|---|
| | (i) Electric charge generated (volt) | (ii) Specific resistance ($\Omega$) | (iii) Wash durability of antistatic property (percent) | | |
| Example 1 | +1,000 | $8.0 \times 10^8$ | 40 | 23 | +10 |
| Untreated * (control) | +4,600 | $1 \times 10^{12}$ | | >180 | −5 |
| N-methoxymethyl nylon alone plus catalyst (Comparison 1) | +4,800 | $>10^{12}$ | | >180 | −10 |
| Polyethylene glycol alone molecular weight 1,500 (Comparison 2) | +1,500 | $8.5 \times 10^9$ | 200 | >180 | −5 |
| N-methoxymethyl nylon plus sorbitol plus catalyst (Comparison 3) | +4,800 | $>10^{12}$ | | >180 | −10 |
| N-methoxymethyl nylon plus polyvinyl alcohol plus catalyst (Comparison 4) | +2,900 | $5.2 \times 10^{10}$ | 70 | 100 | −10 |

*The voltage of the electric charge generated shown by the control was always 4,500–5,000 volts, and hence there was no antistatic activity.

As can be seen from the results shown in the foregoing table, no antistatic effects are had at all by the use of N-methoxymethyl nylon alone or even if polyhydric alcohols are conjointly used therewith, and the handle is also not satisfactory. On the other hand in the case of the yarn of polyethylene glycol alone or N-methoxymethyl nylon and polyvinyl alcohol, the wash durability of the antistatic property is very poor in that it is practically all washed away. In contradistinction, in the case of Example 1 according to this invention, it can be seen that the fabric treated demonstrates the possession of an excellent antistatic property and durability thereof, thus indicating its excellent soil proofness.

EXAMPLES 2-11

Example 1 was repeated except that the classes of the components (a), (b) and (c), their amounts, and treatment conditions were varied. The treatment liquid used and the treatment conditions are shown in Table II and II' below, while the results obtained are shown in Table III. The test methods and the indications used in Table III are identical to those of Table I.

TABLE II'

| | Treatment conditions | |
|---|---|---|
| Fabric treated | Pickup (percent by weight) | Heat treatment (° C.) × (sec.) |
| Example No.: | | |
| 2 — Nylon knit fabric | 1(100) | (100)×(30.0) / (160)×(30.0) |
| 3 — do | 1(70) | (140)×(20) / (160)×(20) |
| 4 — do | 1(70) | (120)×(300) / (160)×(60) |
| 5 — do | 1(60) | (100)×(30.0) / (160)×(12.0) |
| 6 — Nylon carpet | 1(80) | (140)×(200) / (160)×(20) |
| 7 — Polyester knit fabric | 1(50) | (120)×(12.0) / (160)×(60) |
| 8 — Nylon knit fabric | 1(75) | (120)×(120) / (160)×(60) |
| 9 — Nylon knitted goods | 1(78) | (120)×(180) / (160)×(60) |
| 10 — do | 1 67.7 | (120)×(180) / (160)×(30) |
| 11 — do | 1 68 | (120)×(180) / (160)×(30) |

1 Dipping.

TABLE III

| | Antistatic properties | | | | |
|---|---|---|---|---|---|
| | (i) | (ii) | (iii) | | |
| | Electric charge generated (volt) | Specific resistance (Ω) | Wash durability of antistatic property (percent) | Wettability (sec.) | Handle |
| Example No. corresponding to— Nos. of Table II: | | | | | |
| 2 | 1,800 | 2.5×10⁹ | 71.0 | 35.0 | +5 |
| 3 | 1,750 | 3.0×10⁹ | 72.0 | 32.0 | +5 |
| 4 | 1,500 | 2.1×10⁹ | 45.0 | 24.5 | +5 |
| 5 | 1,300 | 9.4×10⁸ | 65.0 | 25.7 | +5 |
| 6 | 1,300 | 9.0×10⁸ | 40.0 | 26.0 | +5 |
| 7 | 1,300 | 9.5×10⁸ | 71.0 | 28.7 | +5 |
| 8 | 1,100 | 7.2×10⁸ | 42.0 | 24.5 | +5 |
| 9 | 1,150 | 7.0×10⁸ | 61.0 | 28.5 | +5 |
| 10 | 1,200 | 7.5×10⁸ | 48.0 | 27.4 | +5 |
| 11 | 1,100 | 7.0×10⁸ | 47.0 | 32.1 | +5 |

TABLE II

| | Treatment liquid | | | | | |
|---|---|---|---|---|---|---|
| | Component (a) (the amount and combined formaldehyde: percent by weight) | Amount used of component (a) (parts by weight) | Component (b) (value of m×p) | Amount used of component (b) (parts by weight) | Component (c) | Amount used of component (c) (parts by weight) |
| Example No.: | | | | | | |
| 2 | N-methoxymethyl nylon (5.1). | 60% aqueous methanol solution containing 0.5 part by weight of component (a) (100). | Polyethylene glycol with mol. wt. of about 1,500 and PD of about 34. | (2.0) | Ammonium citrate. | 0.4% solution of water (2.0). |
| 3 | N-methoxymethyl nylon (5.6). | 0.5% aqueous dispersion (100). | Polyoxyethylenesorbitan monolaurate (60). | (2.5) | Ammonium oxalate. | 2.0% solution of water (0.2). |
| 4 | (5.5) | do | Poloxyethylene glycerin ether (45). | (3.5) | do | Do. |
| 5 | N-methoxymethyl nylon (7.0). | 0.8% aqueous dispersion (100). | Polyoxyethylenesorbitol ether (40) and polyoxyethylene tetramine (40). | (1.5, 1.5) | Maleic acid | 4% solution of water (0.8). |
| 6 | N-methoxymethyl (5.2). | 0.7% aqueous dispersion (100). | Polyoxyethylene-pentaerythritol ether (50). | (3.5) | Citric acid | 4% solution of water (5.0). |
| 7 | N-methylolpolyamide (6.5). | 60% aqueous methanol solution containing 1.0 part by weight of component (a) (100). | Polyoxyethylene-pentamine (40.) | (4.0) | Oxalic acid | 1% solution of water (4.0). |
| 8 | N-methoxymethyl nylon (6.5). | 0.5% aqueous dispersion (100). | Polyoxyethylene-sugar ether (35). | (3.2) | Ammonium oxalate. | 2.0% solution of water (0.2). |
| 9 | N-methoxymethyl nylon 7.1. | do | Ethylene oxide adduct of NH₂-CH₂CH₂-O-CH₂CH₂-O-CH₂CH₂-NH₂. | 3.2 | do | 2.0% solution of water (3.0). |
| 10 | N-methoxymethyl nylon (6.1). | do | Polyoxyethylene-sorbitol ether further added with 20 mols of propylene oxide. | 3.5 | do | 2.0% solution of water (0.2). |
| 11 | N-methoxymethyl nylon (5.4). | do | Polyoxypropylene-sorbitol ether. | 3.2 | do | 2.0% aqueous of water (0.25). |

I claim:

1. A method of imparting improved, durable hydrophilic and antistatic properties to a synthetic fibrous material formed from a synthetic polymer selected from the group consisting of polyamides, polyesters and polyacrylonitriles which comprises applying to said synthetic fibrous material a liquid composition consisting essentially of an aqueous dispersion or water-containing methanol solution containing
   (a) an N-methylol or alkylated methylol substituted polyamide, the degree of substitution based upon the methylol content being 3–15% by weight;
   (b) an alkoxylated derivative of an aliphatic nitrogen or oxygen containing compound having an active hydrogen atom bonded to the nitrogen or oxygen atom and containing at least two functional groups, said derivative being the reaction product of 5–100 moles of ethylene oxide or methyl ethylene oxide with 1 mole of a member selected from
      (i) aliphatic polyhydric alcohols;
      (ii) aliphatic heterocyclic polyhydric alcohols;
      (iii) fatty acid esters of aliphatic alcohols;
      (iv) polyalkylene polyamines; and
      (v) polyoxyalkylene polyamines;
   (c) 1–20% by weight, based on the weight of component (a), of a catalyst selected from the group consisting of acids and acid-forming substances, wherein the weight ratio of (a) to (b) is 1:1 to 1:10, and the concentration of (a), (b) and (c) in the composition is 0.1–5.0%; and
   (d) an aqueous carrier;
thereafter heat treating the liquid composition-containing fibrous material to effect the reaction of (a), (b) and (c) on said material.

2. The method of claim 1 wherein said N-alkylated methylol substituted polyamide is selected from such polyamides wherein the alkylated methylol substitution is selected from $-CH_2OCH_3$, $-CH_2OC_3H_7$, and $$CH_2-OC_4H_9$$

3. The method of claim 1 wherein the methylol content of said N-methylol or alkylated methylol substituted polyamide is 4–10% by weight.

4. The method according to claim 1 wherein said component (c) catalyst is a member selected from the group consisting of oxalic, maleic, citric, butyric, tartaric, boric and chloroacetic acids, and the volatile amines and ammonium salts thereof.

5. The method according to claim 1 wherein said heat treatment consists of a primary and a secondary heating step, characterized in that the heating temperature of the latter is higher than that of the former.

6. The method according to claim 5 wherein said heat treatment temperature ranges between 80° and 180° C.

References Cited

UNITED STATES PATENTS

| | | | |
|---|---|---|---|
| 2,443,450 | 6/1948 | Graham et al. | 117—161P |
| 2,714,075 | 7/1955 | Watson et al. | 117—161P |

FOREIGN PATENTS

| | | | |
|---|---|---|---|
| 901,202 | 7/1962 | Great Britain | 117—Antistatic |

WILLIAM D. MARTIN, Primary Examiner

J. E. MILLER, Assitant Examiner

U.S. Cl. X.R.

117—139.5, 161; 161—227